United States Patent
Strong

(10) Patent No.: US 7,373,055 B1
(45) Date of Patent: May 13, 2008

(54) SYSTEM AND METHOD FOR PROVIDING A BUFFER TUBE INCLUDING A JET

(75) Inventor: Patrick Strong, Connelly Springs, NC (US)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/621,351

(22) Filed: Jan. 9, 2007

(51) Int. Cl.
*G02B 6/44* (2006.01)

(52) U.S. Cl. ...................................... 385/100

(58) Field of Classification Search ................. 385/100
See application file for complete search history.

(56) References Cited

U.S. PATENT DOCUMENTS

| | | | |
|---|---|---|---|
| 4,065,280 A | * | 12/1977 | Kao et al. ................... 65/413 |
| 4,129,466 A | * | 12/1978 | Portinari et al. .............. 156/48 |
| 4,512,281 A | * | 4/1985 | Yamanishi et al. ......... 118/627 |
| 4,772,435 A | | 9/1988 | Schlaeppi et al. |
| 5,092,117 A | | 3/1992 | Päivinen et al. |
| 5,102,584 A | | 4/1992 | Päivinen et al. |
| 5,372,757 A | | 12/1994 | Schneider |
| 5,938,987 A | | 8/1999 | Päivinen |
| 5,974,837 A | * | 11/1999 | Abbott et al. ................. 65/432 |
| 6,135,336 A | | 10/2000 | Linderoth |
| 6,634,075 B1 | | 10/2003 | Lento |
| 6,814,271 B1 | | 11/2004 | Parmanen et al. |
| 2003/0066547 A1 | * | 4/2003 | Burke et al. .................. 134/21 |
| 2007/0286950 A1 | * | 12/2007 | Kwon et al. ............. 427/163.2 |

* cited by examiner

*Primary Examiner*—Ellen E. Kim
(74) *Attorney, Agent, or Firm*—Sughrue Mion, PLLC

(57) ABSTRACT

A system and method for providing a buffer tube. The system includes a crosshead that coats at least one optical fiber with a buffer tube coating; a vat that includes a fluid, the fluid within the vat cooling the buffer tube coating to form a buffer tube, and the vat being provided downstream of the crosshead; a pulling roller that pulls the cooled buffer tube, the pulling roller being provided downstream of the vat; and a jet provided within the vat. The jet jets a jetting fluid against the buffer tube coating so as to compresses the buffer tube coating in a region downstream of the jet.

20 Claims, 3 Drawing Sheets

SYSTEM AND METHOD FOR PROVIDING A BUFFER TUBE INCLUDING A JET

BACKGROUND

1. Field of the Invention

This invention generally relates to a system and method for providing a buffer tube and, more particularly, to a system and method for providing a buffer tube that includes a jet that jets fluid against a buffer tube coating.

2. Description of the Related Art

As shown in FIG. 1, in a conventional system for providing a buffer tube, a plurality of optical fibers 10 are pulled through a crosshead 20 by a pulling capstan 30. The crosshead 20 extrudes a buffer tube coating 40 around the optical fibers 10. Then, the buffer tube coating 40 is quickly solidified by pulling the coating 40 (with fibers 10 within the coating 40) through a vat 50 of water. The buffer tube shrinks when it is cooled.

When the coating 40 shrinks, the actual lengths of the optical fibers 10 within the coating 40 become longer than the length of the buffer tube coating 40 that surrounds the fibers 10, and the optical fibers 10 within the buffer tube coating 40 become curved. This extra length is referred to as excess fiber length, or EFL. It is generally desirable to have a small amount of EFL, for example in order to protect the fibers 10 from stress. However, too much EFL is not desirable because it can cause bunching of the fibers 10 within the coating 40 and related attenuation problems.

During manufacturing of the buffer tube, the quick solidification of the coating 40 prevents the coating from shrinking as much as the coating would shrink if it were given more time before solidification. Accordingly, the structure of the coating 40 of a manufactured buffer tube has a built in tendency to shrink.

Before a buffer tube design is used commercially, manufactured buffer tubes of that design are subjected to temperature cycling in order to determine whether they are suitable for field use. This temperature cycling is used to simulate aging of the buffer tubes in a short period of time. For example, the temperature to which the buffer tube is subjected can be cycled between a low temperature of –50 degrees C. and a high temperature of 70 degrees C., or even hotter, for a period of up to two weeks.

However, because the structure of the coating 40 solidifies with a built in tendency toward shrinking, the coating 40 will further shrink when the manufactured buffer tube is subjected to extreme heat during the temperature cycling. This further shrinkage causes the EFL within the buffer tube to increase, which, as discussed above, can cause bunching of the fibers 10 within the coating 40 and related attenuation problems. Therefore, it is desirable to reduce this change in EFL.

FIG. 2 shows a related art system directed at reducing the change in the EFL when the buffer tube is subjected to temperature cycling. In this system, two clenching capstans (or caterpillars) 60 are provided within the vat 50; one of the capstans 60 is provided above the coating 40 and another is provided below the coating 40. The clenching capstans 60 are positioned between the crosshead 20 and pulling capstan 30 because, at this position, the coating 40 is only constrained at one end (i.e., the pulling capstan 30). Therefore, the clenching capstans 60 do not cause tension on any part of the coating system.

The clenching capstans 60 rotate at a velocity that is greater than the velocity of the coating 40 pulled by the capstan 30 and press against the coating 40. Therefore, the structure of the coating 40 is compressed in the downstream region between the clenching captans 60 and the pulling capstan 30 while the coating is cooled. Due to the fact that the structure of the coating 40 is compressed by the clenching capstans 60, the structure of the coating 40 will have a tendency to recoil or expand. However, because the coating 40 solidifies so quickly, the coating's structure does not expand as much as it would if it were given more time before solidification. Accordingly, the structure of the coating 40 will have a built in tendency to expand.

Thus, when the buffer tube is later subjected to temperature cycling, this tendency toward expansion of the coating 40 counteracts the coating's other tendency to shrink. Therefore, the amount of change in EFL is reduced, or eliminated, as compared to that resulting from the FIG. 1 arrangement.

Although the related art system of FIG. 2 does reduce the change in excess fiber length, because the clenching capstan 60 are provided within the vat 50 of water, the capstans 60 must be protected from the water. The system is therefore complex and requires much maintenance, which increases its cost. Moreover, because only two capstans 60 are typically used with the buffer tube 40, the buffer tube 40 of FIG. 2 is not evenly compressed and is instead flattened into an oval shape. Therefore, it would be beneficial to provide a device that provides this compression to the coating 40 in a better, more convenient, and more efficient manner than these clenching capstans 60.

SUMMARY OF THE INVENTION

A first exemplary aspect of the invention is a system for providing a buffer tube including a crosshead that coats at least one optical fiber with a buffer tube coating; a vat that includes a fluid, the fluid within the vat cooling the buffer tube coating to form a buffer tube, and the vat being provided downstream of the crosshead; a pulling roller that pulls the cooled buffer tube, the pulling roller being provided downstream of the vat; and a jet provided within the vat. The jet jets a jetting fluid against the buffer tube coating so as to compresses the buffer tube coating in a region downstream of the jet.

A second exemplary aspect of the invention is a method for providing a buffer tube, including coating at least one optical fiber with a buffer tube coating; cooling the buffer tube coating within a vat provided with a fluid to form a buffer tube, the vat being provided downstream of the crosshead; pulling the cooled buffer tube from a position downstream of the vat; and jetting a jetting fluid against the buffer tube coating so as to compresses the buffer tube coating in a region downstream of the jet, the jetting being provided within the vat.

BRIEF DESCRIPTION OF THE DRAWINGS

The advantages, nature and various additional features of the invention will be more fully apparent upon consideration of the exemplary embodiment of the invention, which is schematically set forth in the drawings, in which.

DETAILED DESCRIPTION OF THE EXEMPLARY EMBODIMENT

Figure 1:
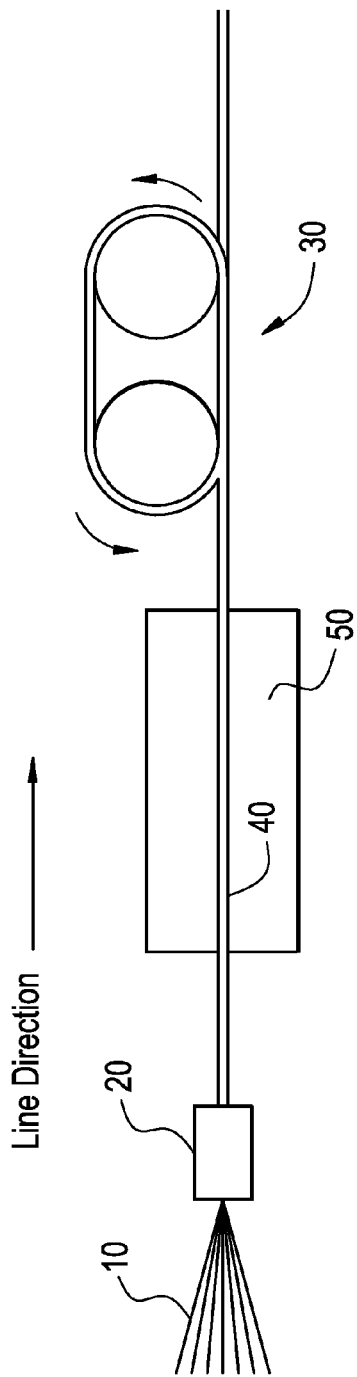
FIG. 1 is a schematic view of a conventional system for providing a buffer tube.

While the invention is open to various modifications and alternative forms, a specific embodiment thereof is shown by way of examples in the drawings and is described herein in detail. There is no intent to limit the invention to the particular form disclosed.

Figure 3:
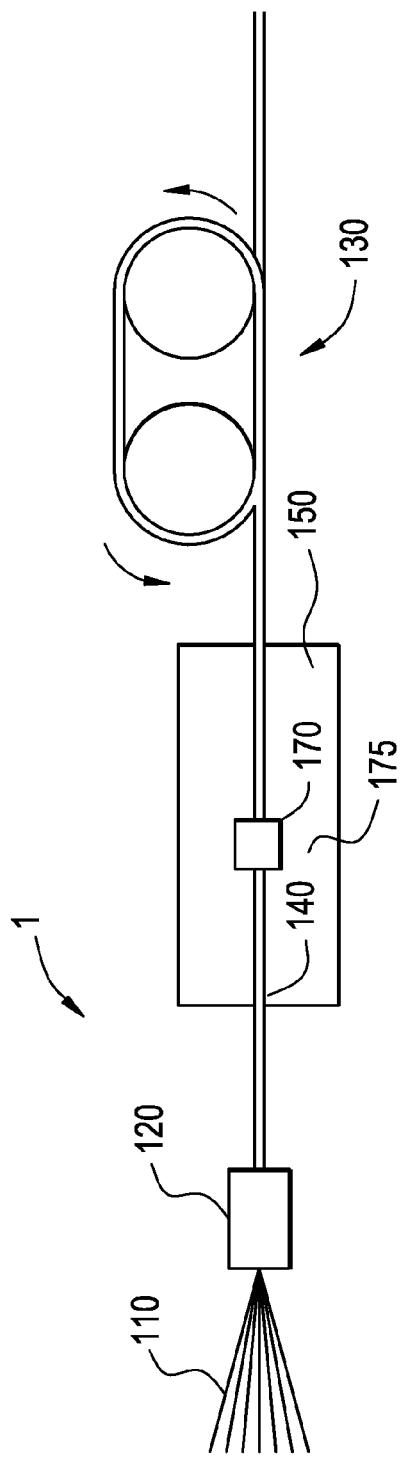
FIG. 3 is a schematic view of a system for providing a buffer tube including a buffer tube jet within the cooling vat according to an exemplary embodiment of the invention.

FIG. 3 is a schematic view of an exemplary embodiment of a system 1 for coating a buffer tube. The system 1 includes a crosshead 120, a pulling capstan 130, a vat 150 of fluid 175, and a jet 170. One of ordinary skill will understand the specific structures of the crosshead 120, capstan 130, and vat 150 and that the invention is not limited to these specific structures.

In an operation of the system 1, optical fibers 110 are taken from payoff reels (not shown) and pulled through the crosshead 120. The crosshead 120 extrudes a buffer tube coating 140 around the optical fibers 110 in a conventional manner. The buffer tube coating 140 can be, for example, polyethylene, polycarbonate, or another suitable material.

The capstan 130 pulls the coating 140 and, therefore, the optical fibers 110 within the coating 140. The capstan 130 can be, for example, two capstan rollers, and the cooled buffer tube coating 140 (and therefore the optical fibers 110) is rotated around the capstan 130 at least one time. The capstan 130 typically pulls the coating 140 (and optical fibers 110) at a velocity between 150 and 300 m/min; however, the invention is not limited in this respect.

Figure 4:
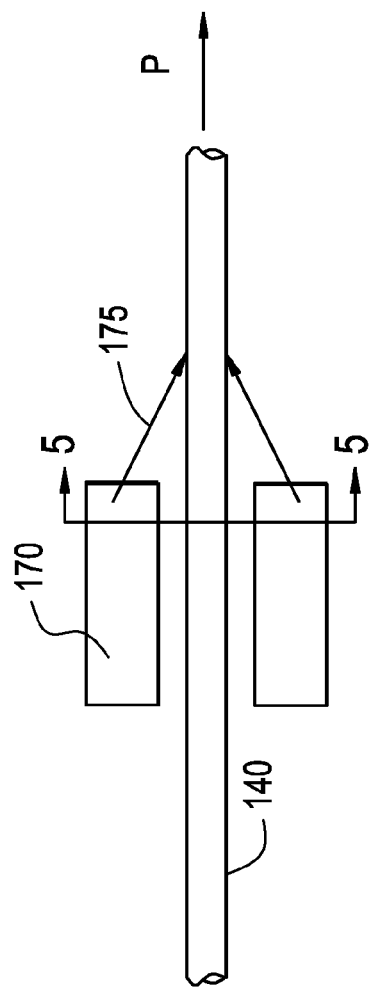
FIG. 4 is a detailed view showing the system's jet.

The coating 140 is pulled through the vat 150 in order to solidify the coating 140. The cooling fluid 175, which can be but is not limited to water, and a jet 170 are provided within the vat 150. As shown in FIG. 4, the jet 170 jets the fluid 175 within the vat 150 toward the coating 140 in a downstream direction and at an angle. That is, the jetted fluid 175 is jetted against the coating 140 in the same direction as a coating pulling direction P. The jetted fluid 175 applies a downstream force on the coating 140 along the axis of the coating in order to compresses the coating 140 in the downstream region between the jet 170 and the capstan 130.

Accordingly, the coating 140 will have a built in tendency to recoil or expand, thereby reducing the amount of change in EFL of the optical fibers within coating 140 if the buffer tubes are later subjected to temperature cycling. It is expected that the use of the jet 170 will reduce the change in EFL so that it is less than 0.05%. In contrast, if no compression is provided, the change in EFL after temperature cycling could be as high as 0.30%.

In order for the jetted fluid 175 to provide a positive pushing or compressive force to the coating 140 (which will counteract the coating's built in tendency to shrink), a longitudinal velocity of the jetted fluid 175 is greater than a pulling velocity of the capstan 130. That is, the jetting fluid 175 is able to provide a compressive force to the coating 140 when the longitudinal component of the fluid's velocity exceeds that of the coating 140.

Figure 2:
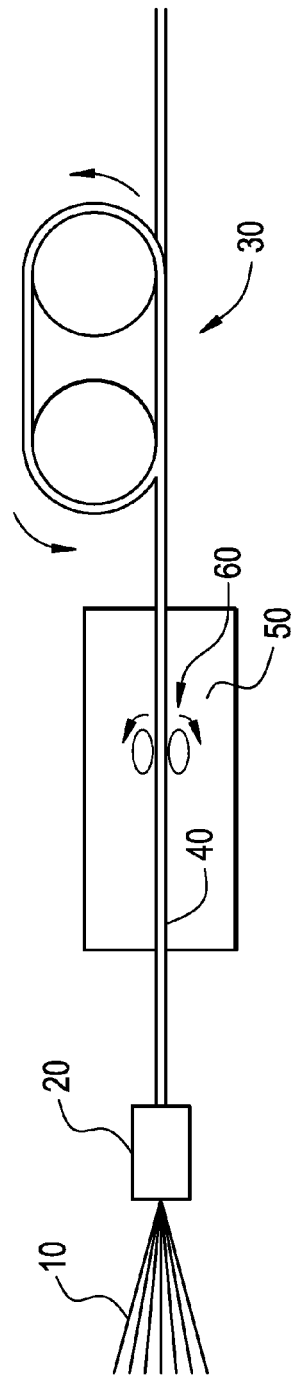
FIG. 2 is a schematic view of a related art system for providing a buffer tube including a clenching capstan within a cooling vat.

Moreover, the jet 170 is preferably configured so that the jetted fluid 175 contacts the coating 140 at substantially a circumference of the coating 140. Therefore, the shape of the buffer tube is not flattened like that of a buffer tube produced by the related art system shown in FIG. 2.

The jet 170 can be provided anywhere between the crosshead 120 and the capstan 130. However, the closer the jet 170 is provided to the crosshead 120, the more compression is provided to the coating 140. Therefore, it can be beneficial to position the jet 170 closer to the crosshead, but the invention is not limited in this way.

One of ordinary skill will understand that the any jet 170 that is capable of providing compression to the coating 140 can be used in the invention and that the invention is not limited to the specific structures of the jet 170. However, a jet 170 as shown in the exemplary embodiment of FIG. 5 could be used.

Figure 5:
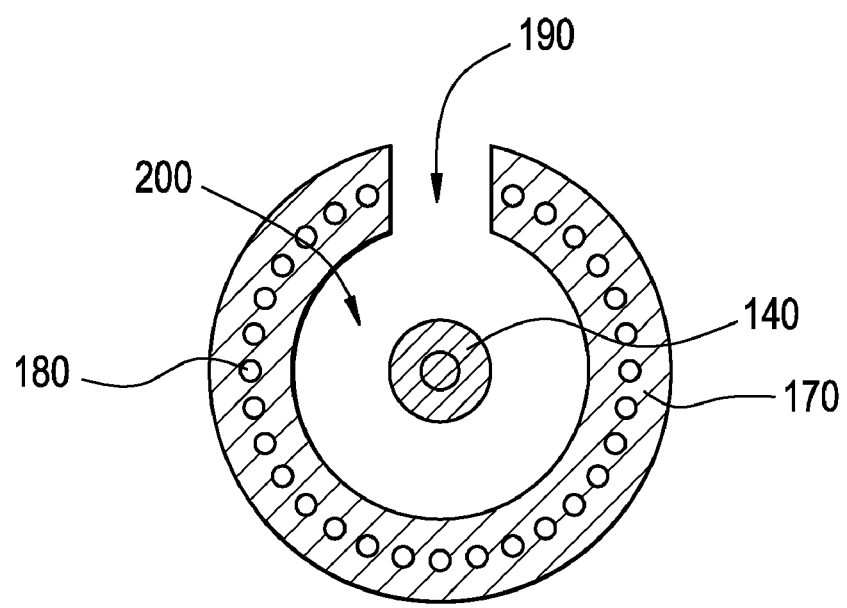
FIG. 5 is a cross sectional view of the jet of FIG. 4 taken along the line 5-5.

As shown in FIG. 5, the jet 170 is an annular member including a ring of nozzles 180. The nozzles 180 are configured to jet the fluid 175 toward the coating 140 at an angle greater than 0 degrees and less than 90 degrees, and preferably at an angle between 5 and 50 degrees. When the angled fluid flow contacts the coating 140, the fluid 175 compresses the coating 140.

A suction pump (not shown) that is within the vat 150 provides a suction that introduces the fluid 175 within the vat 150 to the jet 170. For example, the pump could introduce pressurized fluid to a tube (not shown) that is connected to the jet 170. The jet 170 and tube can be connected by, for example, threads. Then, the pressurized fluid, which is introduced to the jet 170 via the pump and tube, exits at a high velocity.

Although the fluid 175 within the vat 150 is used as the jetting fluid in the exemplary embodiment, the invention is not limited in this respect. For example, a fluid from outside the vat 150 could be introduced to the vat 150 by a tube. Although this is consistent with the invention, such a structure would add to the complexity of the system.

As shown in FIG. 5, the jet 170 of the exemplary embodiment includes an opening 200, and the pulled coating 140 is provided within the opening 200. For example, the jet 170 can be an annular member, which would reduce the size of the jet 170. The jet 170 also includes a ring of nozzles 180 configured so that the jetting fluid 175 contacts the coating 140 at substantially an entire circumference of the coating 140 within the opening 200.

Moreover, the jet 170 can include a break 190. The break 190 is larger than a diameter of the coating 140. This allows the jet 170 to be easily positioned around the coating 140. The jet 170 can be made of, for example, stainless steel, plastic, brass, aluminum, or another material that does not corrode in water.

Because the jet 170 may use the cooling fluid 175 to compress the coating 140, the system 1 can provide additional cooling while providing compression. Moreover, because the jet 170 is designed for use within a fluid, it can be easily incorporated into the system for providing a buffer tube. In contrast, the related art clenching capstans 60 shown in FIG. 2 must be protected from the fluid within the vat, which increases the system's cost.

The invention is not limited to the exemplary embodiment described above. That is, departures can be made from the exemplary embodiment without departing from the spirit and scope of the invention, which is only limited by the following claims.

What is claimed is:

1. A system for providing a buffer tube, comprising:
   a crosshead that coats at least one optical fiber with a buffer tube coating;
   a vat that includes a fluid, the fluid within the vat cooling the buffer tube coating to form a buffer tube, and the vat being provided downstream of the crosshead;
   a pulling roller that pulls the cooled buffer tube, the pulling roller being provided downstream of the vat; and a jet provided within the vat, wherein the jet jets a jetting fluid against the buffer tube coating so as to compresses the buffer tube coating in a region downstream of the jet.

2. The system of claim 1, wherein the pulling roller comprises a capstan.

3. The system of claim 2, wherein the cooled buffer tube coating is rotated around the capstan at least one time.

4. The system of claim 1, wherein the jet is configured such that the jetted fluid contacts the buffer tube coating at substantially a circumference of the buffer tube coating.

5. The system of claim 1, wherein the jet jets the fluid against the buffer tube at a longitudinal velocity that is greater than a velocity of the buffer tube pulled by the pulling roller.

6. The system of claim 5, wherein the velocity of the buffer tube is between 150 and 300 m/min.

7. The system of claim 1, wherein the at least one optical fiber is a plurality of optical fibers.

8. The system of claim 1, wherein the jet comprises an opening, and the buffer tube coating is provided within the opening.

9. The system of claim 8, wherein the jet comprises at least one ring of nozzles.

10. The system of claim 1, wherein the jetted fluid is the fluid within the vat.

11. The system of claim 1, wherein the jet is configured such that the jetted fluid contacts the buffer tube coating at an angle.

12. The system of claim 11, wherein the jet is configured such that the jetted fluid contacts the buffer tube coating at an angle between 5 and 50 degrees.

13. A method for providing a buffer tube, comprising:
coating at least one optical fiber with a buffer tube coating;
cooling the buffer tube coating within a vat provided with a fluid to form a buffer tube, the vat being provided downstream of the crosshead;
pulling the cooled buffer tube from a position downstream of the vat; and
jetting a jetting fluid against the buffer tube coating so as to compresses the buffer tube coating in a region downstream of the jet, the jetting being provided within the vat.

14. The method of claim 13, wherein the jetting of the jetting fluid against the buffer tube coating comprises contacting the buffer tube coating at substantially a circumference of the buffer tube coating.

15. The method of claim 13, wherein the jetting of the jetting fluid against the buffer tube coating comprises jetting the jetting fluid against the buffer tube at a longitudinal velocity that is greater than a velocity of the buffer tube pulled by the pulling roller.

16. The method of claim 15, wherein the velocity of the buffer tube is between 150 and 300 m/min.

17. The method of claim 13, wherein the at least one optical fiber is a plurality of optical fibers.

18. The method of claim 13, wherein the jetted fluid is the fluid within the vat.

19. The method of claim 13, wherein the jetting of the jetting fluid against the buffer tube coating comprises contacting the buffer tube coating at an angle.

20. The method of claim 19, wherein the jetting fluid contacts the buffer tube coating at an angle between 5 and 50 degrees.

\* \* \* \* \*